(No Model.)
R. F. RANDALL.
COFFEE POT.
No. 481,769. Patented Aug. 30, 1892.
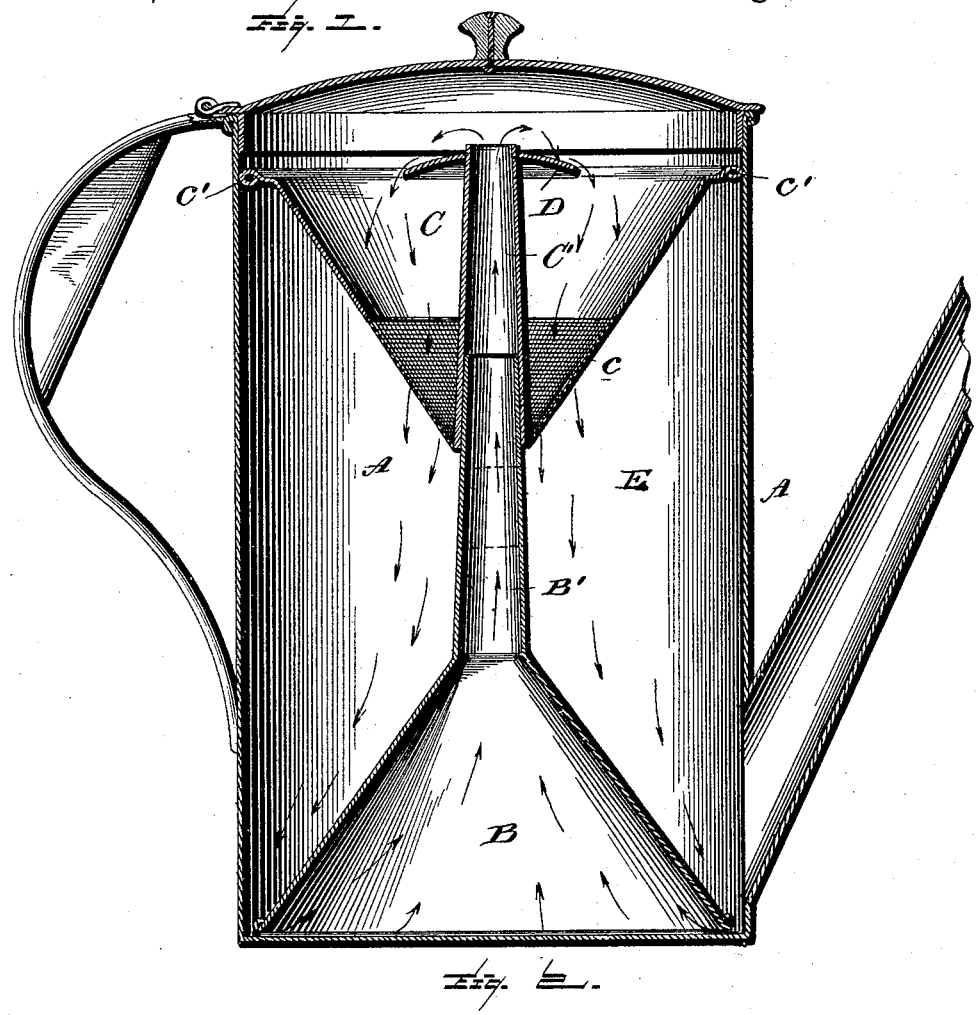
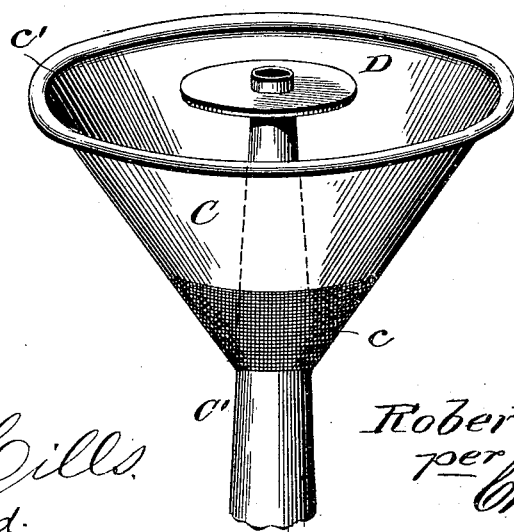
Witnesses
L. C. Hills.
E. K. Bond.
Inventor
Robert F. Randall,
per Chas. N. Fowler,
Attorney.

UNITED STATES PATENT OFFICE.

ROBERT F. RANDALL, OF NEWARK, NEW YORK, ASSIGNOR TO HIMSELF, JAMES P. BALLOU, AND E. VAN PEIRSON, OF SAME PLACE.

COFFEE-POT.

SPECIFICATION forming part of Letters Patent No. 481,769, dated August 30, 1892.

Application filed April 6, 1892. Serial No. 428,069. (No model.)

*To all whom it may concern:*

Be it known that I, ROBERT F. RANDALL, a citizen of the United States, residing at Newark, in the county of Wayne and State of New York, have invented certain new and useful Improvements in Coffee-Pots; and I do hereby declare that the following is a full, clear, and exact description of the same, reference being had to the annexed drawings, making a part of this specification, and to the letters of reference marked thereon.

This invention relates to certain new and useful improvements in attachments to coffee and tea pots and the like and is for use in making tea, coffee, and the like, or anywhere that it is desired to extract the juice from meats or to steep anything. In the present case it will be shown and described in connection with a tea or coffee pot; but it will be understood that the invention is not restricted to such use.

I provide a fountain with a basin or receptacle near its upper end, and the parts are so constructed as to be easily detachable when desired. The coffee or tea is placed in the basin, which has its lower portion perforated, and as the water in the pot boils it is forced upward through the pipe of the fountain and over onto the coffee or tea in the basin or percolator. A spreader is placed at the upper end of the pipe of the fountain to spread the water as it is forced upward therethrough. The pipe is adjustable in length or height, so that one, two, or more cups can be made, as may be desired. Coffee can be made quickly and with little or no trouble, and when made will be entirely free of grounds and will be of a delicious flavor and color.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a central vertical section through a coffee-pot equipped with my improvements. Fig. 2 is an enlarged perspective view of the percolator detached.

Like letters of reference indicate like parts in both views.

Referring now to the details of the drawings by letter, A designates a coffee or tea pot of known or any approved construction.

B designates a conical-shaped metallic device provided with a pipe or tube B', extending from its apex, and which tube or pipe is made adjustable in length, being made up of telescopic sections, as seen in Fig. 1, or it may be made in sections which are removable for the same purpose. By this means I am enabled to bring the percolator nearer to or farther from the water, as may be required.

C is an inverted-cone-shaped vessel having extending up centrally therethrough the tube C', which is of such a size relative to the tube B' as to slip on over it, as seen in Fig. 1, and at its upper end it is preferably provided with a convex plate D, which serves to spread the liquid, as will be readily understood from Fig. 1. The lower portion of the percolator or vessel C is perforated or covered with gauze, as seen at c in both views, for the outlet of the liquid.

The vessel B is designed to be of such a size relative to the pot in which it is to be used as to practically fit the same and permit of its easy insertion and removal. The vessel C at its larger end is of such a diameter as to be a close fit within the pot, as seen in Fig. 1, and its edge may be strengthened by a bead c', as shown.

The device may be made complete in itself and placed upon the market to be sold for use with any coffee or tea pot.

The manner of use will be readily perceived. The device is placed in the pot, as shown in Fig. 1, the water being placed in the pot and the coffee or tea in the percolator C, and when the water begins to boil the water is forced up through the pipes B' and C', as indicated by the arrows, and over the spreader and down through the coffee, leaching the same. As soon as the water commences to boil the operation becomes continuous until stopped. When the operation has continued for the desired length of time, the attachment may be removed or not, as may be deemed best.

It is proposed to make the device of varying sizes to fit different-sized pots. The tube of the vessel C need not extend to the top thereof.

Other modifications in detail may be resorted to without departing from the spirit of the invention or sacrificing any of its advantages.

It will be noticed that the vacant space between the cone-shaped vessels, as indicated at E, forms a steam-chest, where the steam accumulates and creates a pressure on the water in the pot, thus helping to force it under the lower one of the cone-shaped vessels and up through the pipes or tubes.

What is claimed as new is—

A coffee-pot attachment consisting of a conical vessel with tubular extension, an inverted-cone-shaped vessel having its lower portion reticulated and a tubular portion detachably held on the tubular extension of the cone, and a spreader on the said tubular portion below the upper end thereof, as set forth.

In testimony that I claim the above I have hereunto subscribed my name in the presence of two witnesses.

ROBERT F. RANDALL.

Witnesses:
JAMES P. BALLOU,
CARLOS A. STEBBINS.